US007579966B2

(12) United States Patent  
Priest

(10) Patent No.: US 7,579,966 B2
(45) Date of Patent: Aug. 25, 2009

(54) DUAL-AXIS LOADMETER

(75) Inventor: James Priest, Collierville, TN (US)

(73) Assignee: Calspan Corporation, Buffalo, NY (US)

( * ) Notice: Subject to any disclaimer, the term of this patent is extended or adjusted under 35 U.S.C. 154(b) by 417 days.

(21) Appl. No.: 11/420,829

(22) Filed: May 30, 2006

(65) Prior Publication Data

US 2007/0279253 A1    Dec. 6, 2007

(51) Int. Cl.
*G08B 23/00*    (2006.01)
(52) U.S. Cl. .................. 340/963; 340/967; 340/968; 340/980
(58) Field of Classification Search ............ 340/963, 340/945, 967, 968, 696, 970, 971, 973, 978, 340/980, 964
See application file for complete search history.

(56) References Cited

U.S. PATENT DOCUMENTS 5,912,627 A * 6/1999 Alexander ............ 340/815.4
6,989,769 B2 * 1/2006 Gray .................... 340/984

OTHER PUBLICATIONS

Travis Hunnings; Patent Cooperation Treaty PCT International Search Report for PCT/US07/69747; Form PCT/ISA/210; Aug. 29, 2008; ISA/US; 2 pages.
Travis Hunnings; Patent Cooperation Treaty PCT Written Opinion of the ISA for PCT/US07/69747; Form PCT/ISA/237; Aug. 29, 2008; ISA/US; 4 pages.

* cited by examiner

*Primary Examiner*—Toan N Pham
*Assistant Examiner*—Travis R Hunnings
(74) *Attorney, Agent, or Firm*—Daniel P. Malley; Bond, Schoeneck & King, PLLC

(57) ABSTRACT

The present invention is directed to a computerized system that includes a graphical user interface (GUI) having a display and a data input device. The computerized system performs a method including the step of providing a plurality of aircraft parameters. At least one vertical g-force value is calculated in real time based on the plurality of aircraft parameters. A lateral g-force value is calculated in real time based on the plurality of aircraft parameters. The at least one vertical g-force value is displayed relative to at least one predetermined vertical reference value. The lateral g-force value is displayed relative to at least one predetermined lateral reference value.

45 Claims, 16 Drawing Sheets

DUAL-AXIS LOADMETER

BACKGROUND OF THE INVENTION

1. Field of the Invention

The present invention relates generally to aviation sensor and display technology, and particularly to dual-axis loadmeter systems for ground based training and for airborne systems.

2. Technical Background

At some point in time in the history of aviation, aircraft structural design parameters were defined using a two-dimensional plot of acceleration versus velocity. This two-dimensional curve was commonly referred to as the "flight envelope." While materials, designs, and design parameters have changed and improved over the years, the term flight envelope is still understood as a term that refers to the load factor limits of a particular aircraft design. All structures, of course, have failure modes. When enough force is applied to an object, the object will ultimately deform and fail. This applies to aircraft components/systems such as airframes, engine components, connective elements, wings, rudders, and etc.

Accordingly, each aircraft type is defined by a unique set of limit loads corresponding to the flight envelope. If a load is applied to the aircraft in excess of a predetermined value, i.e., the ultimate limit load, one can expect the aircraft to experience a mechanical failure. The limit load is typically a function of the mechanical properties of the materials comprising the component structures, and therefore, different types of aircraft perform differently, with some being more robust than others. In practice, designers often specify a given aircraft's "limit load" as some arbitrary number lower than the ultimate load. The difference between the limit load and the ultimate limit load, therefore, represents a safety factor. Often, the limit load is selected by dividing the ultimate load by a factor of 1.5 to thereby provide a 50% safety factor.

Thus, an aircraft is being operated safely if a given maneuver is within the flight envelope, i.e., the forces applied to the aircraft during the maneuver should not cause a failure to occur. An "envelope condition" refers to a scenario wherein the aircraft is being operated outside the "envelope"—the pilot attempts a maneuver that results in the application of forces that result in a structural failure. For example, in recent memory, a fatal accident occurred when a pilot improperly operated the pedal controls of the aircraft to effect a rudder hardover event. Excessive forces were applied to the rudder and eventually the tail section separated from the aircraft. Obviously, the pilot had no intention of causing the aforementioned failure mode. The accident occurred because the pilot did not have an a priori understanding of the causal link between his actions and the failure mode.

The ability to safely operate an aircraft is a learned skill. In general, the more experienced a pilot is, the less apt he or she is to maneuver the aircraft in an unsafe manner outside the flight envelope. Thus, it is imperative that a trainee master certain skills before assuming the controls of an aircraft. Accordingly, initial flight training is often provided using a ground-based aircraft surrogate training device—i.e., a ground-based flight simulator. A flight simulator provides a trainee with a safe and cost effective flight training environment. Flight simulators enhance safety because they allow the students to make potentially fatal mistakes, such as operating the aircraft outside the flight envelope, without bearing the unfortunate consequences.

Ground-based flight simulators are also used by experienced pilots as well. Flight simulators may be used to provide experienced pilots with valuable training time for maintaining their skill level. Simulators are cost effective because the cost of fuel, landing fees, and aircraft maintenance costs are avoided. Furthermore, such simulators may be employed to teach an experienced pilot new procedures. They also may be used to teach an experienced pilot how to fly a new, or different, type of aircraft than he or she is used to flying.

Conventional ground-based aircraft simulators may be implemented in a variety of training systems including desktop trainers, part task trainers or full-flight simulators. One drawback to all of these systems methods relates to their inability to generate the "real-world" accelerations—"g-forces" or "g's"—that pilots experience when an identical maneuver is performed on board an aircraft in flight. The ability of the human body to sense g-forces is an important, and indeed an invaluable, feedback mechanism that provides the pilot with a biological signal indicating whether or not a maneuver is being performed correctly. Certain large amplitude training maneuvers generate significant accelerations, and if performed incorrectly, may drive the aircraft into an envelope condition.

Acceleration is measured on board the aircraft with a device commonly referred to as a G-meter. A G-meter may also be referred to as a loadmeter. In its simplest form, a g-force sensor may be implemented using a spring supported mass mechanically coupled to a potentiometer. Of course, the mass is "calibrated" such that it moves in a predetermined manner in response to a corresponding g-force. The movement of the mass changes the resistance of the potentiometer to thereby provide an analog voltage signal as a function of the g-force. Of course, any suitable sensor may be employed. More sophisticated acceleration sensors may use MEMS based accelerometers. In any event, the G-meter is implemented by coupling the sensor to a display mechanism. Some conventional G-meters are realized using a dial having a single needle. Other conventional implementations provide this information in a digital format via an LCD display, for example. In either case, the display is an indication of the g-force measurement at the aircraft centroid or at a point along the centerline of the aircraft.

Unfortunately, the conventional G-meters briefly described above have drawbacks. For example, conventional devices do not provide any measurement of differential g-forces caused by aircraft roll maneuvers or by other such asymmetric loading conditions. Conventional G-meters do not measure or display lateral g's caused by rudder loads. What is needed, therefore, is a loadmeter that is configured to display vertical g-forces, differential g-forces applied along the wingspan, lateral accelerations, and rudder loads relative to the predetermined load limits of the aircraft in real time.

What is also needed is a ground-based aircraft surrogate training device configured to provide a trainee with real-time information corresponding to the g-forces generated by a particular maneuver on a particular type of aircraft. The lack of such information is detrimental to flight training because the trainee may complete a potentially dangerous maneuver in a simulator without becoming unaware of the effects of that particular maneuver on the aircraft. The trainee walks away from the training experience with an inaccurate perception of the effects of the attempted maneuver. The consequences of the trainee's ignorance could be disastrous if an identical maneuver is attempted in flight.

Thus, a loadmeter configured to display vertical g-forces, differential g-forces applied along the wingspan, lateral accelerations, and rudder loads in real time relative to the predetermined load limits of the aircraft is needed for both ground-based simulator applications as well as airborne applications.

SUMMARY OF THE INVENTION

The present invention addresses the needs described above by providing a loadmeter configured to display vertical g-forces, differential g-forces applied along the wingspan, and lateral accelerations, i.e., rudder loads relative to the predetermined load limits of the aircraft in real time.

One aspect of the present invention is directed to a computerized system that includes a graphical user interface (GUI) having a display and a data input device. The computerized system performs a method including the step of providing a plurality of aircraft parameters. At least one vertical g-force value is calculated in real time based on the plurality of aircraft parameters. A lateral g-force value is calculated in real time based on the plurality of aircraft parameters. The at least one vertical g-force value is displayed relative to at least one predetermined vertical reference value. The lateral g-force value is displayed relative to at least one predetermined lateral reference value.

In another aspect, the present invention is directed to a system that includes a computing circuit configured to calculate in real time at least one vertical g-force value and a lateral g-force value based on a plurality of aircraft parameters. The computing circuit is also configured to generate vertical g-force display data and lateral g-force display data. The vertical g-force display data compares the at least one vertical g-force value relative to at least one predetermined vertical reference value. The lateral g-force display data compares the lateral g-force value relative to at least one predetermined lateral reference value. A display device is coupled to the control circuit. The display is configured to display the vertical g-force display data and the lateral g-force display data.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 3 is a block diagram of the signal processing module depicted in FIG. 1;

DETAILED DESCRIPTION

Figure 1:
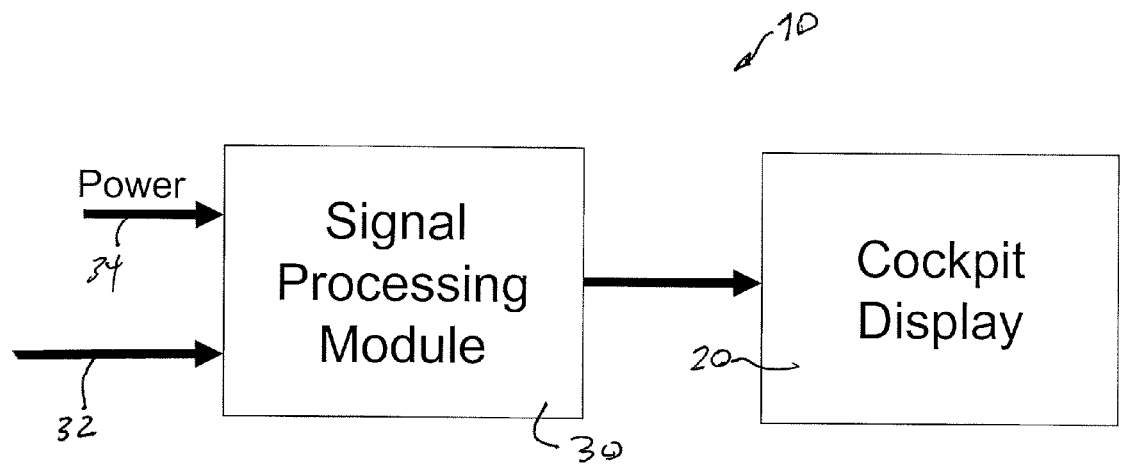
FIG. 1 is a high level block diagram of the system of the present invention.

Reference will now be made in detail to the present illustrated embodiments of the invention, examples of which are illustrated in the accompanying drawings. Wherever possible, the same reference numbers will be used throughout the drawings to refer to the same or like parts. An exemplary embodiment of the dual-axis loadmeter system of the present invention is shown in FIG. 1, and is designated generally throughout by reference numeral 10.

As embodied herein and depicted in FIG. 1, a high level block diagram of the system 10 of the present invention is disclosed. System 10 may be implemented in either an aircraft or in an aircraft surrogate training device (flight simulator). System 10 is a two component system that includes cockpit display element 20 and signal processing module 30. Display 20 is typically mounted in the cockpit of the platform, i.e., in the simulator cab or in the aircraft cockpit. Signal processing module 30 is typically deployed as a separate unit and disposed outside the physical confines of the simulator cab or cockpit. However, those of ordinary skill in the art will understand that display unit 20 and processor module 30 may be implemented as a single unit.

As shown in FIG. 1, signal processing module 30 receives aircraft parameter inputs 32 and power inputs 34 from the aircraft or the simulator. In an aircraft application, system 10 is configured to receive sensor measurements/parameters directly from the on-board aircraft sensors. In simulated environments, system 10 is configured to employ aircraft parameters generated by the aircraft surrogate training platform computing system. As the trainee operates the platform controls, the platform's computer generates simulated aircraft parameters based on a simulated response to the trainee's actions. The aircraft parameters typically include vertical acceleration, equivalent airspeed, angle of sideslip, aileron deflection, and rudder deflection. The calculations performed by processor module 30 are discussed in a subsequent portion of the detailed description.

Signal processing module may be equipped with a power supply (not shown) configured to accommodate various power inputs in accordance with platform specifications. For example, some typical aircraft systems operate using 28 VDC power. In this scenario, the power supply includes DC/DC conversion circuitry to provide the voltage levels required by the logic/processor circuitry. The power input provided by a ground based simulator system may include either DC or AC voltages. In the latter case, the power supply may be equipped with AC/DC conversion circuitry. In another embodiment, the processor module 30 may be configured to accommodate interchangeable power supplies in accordance with the target platform requirements.

Figure 2:
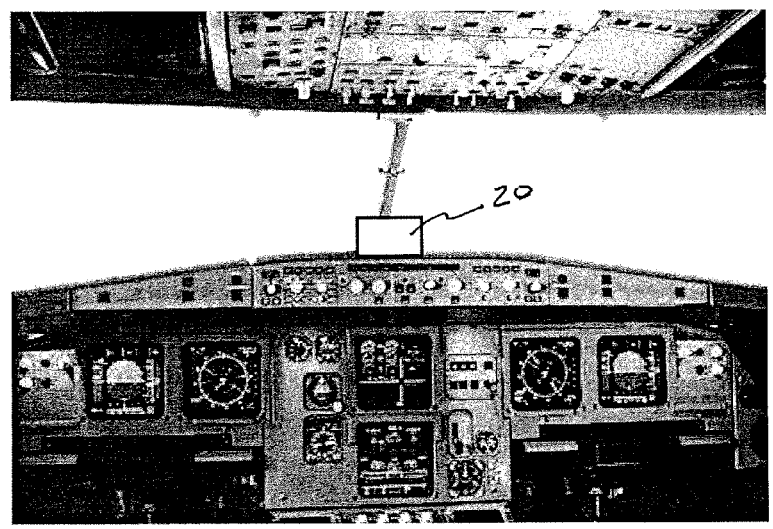
FIG. 2 is a depiction of the cockpit display shown in FIG. 1.
Figure 2:
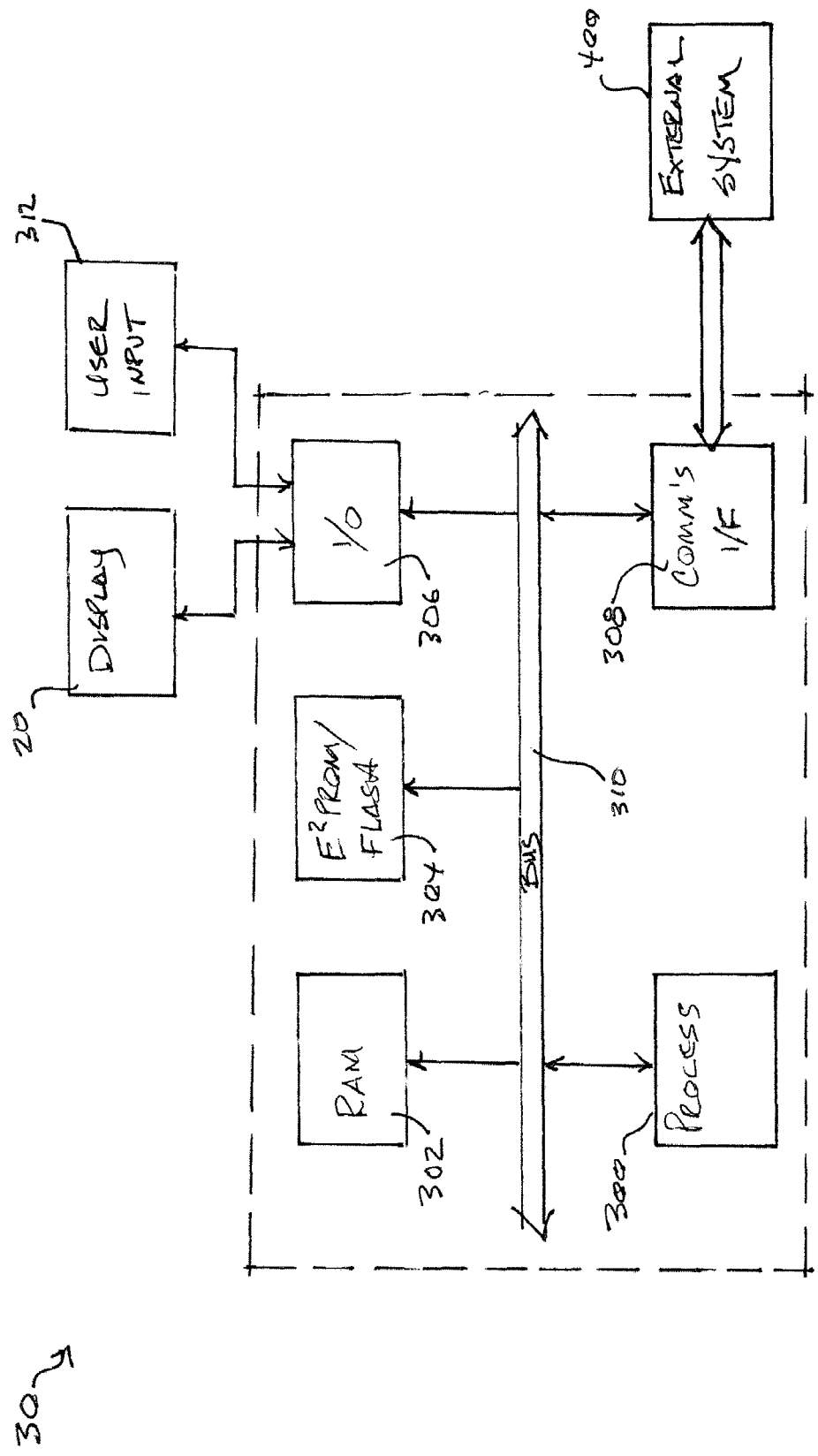

Referring to FIG. 2, display unit 20 is typically mounted on the cockpit glareshield where it may be easily read by the pilot(s) in the aircraft application, and by the trainee and simulator instructor/operator in the ground-based simulator application.

As embodied herein and depicted in FIG. 3, a detailed block diagram of the signal processing module in accordance with one embodiment of the present invention is shown. System processing module 30 typically includes a processor 300, random access memory (RAM) 302, read only memory 304, I/O circuit 306, and communication interface circuitry 308 coupled together by way of bus system 310. As those of ordinary skill in the art will understand, bus system 310 typically provides data, address, and control lines between the processor 300 and the other system components.

The methods for providing a real time display of vertical g-forces, differential g-forces applied along the wingspan, and rudder loads relative to the predetermined limit loads of the aircraft, or simulated aircraft, are performed by the signal processor module 30 in response to the execution of programming instructions stored in memory. The instructions operate on the real-time data provided by aircraft sensors or from simulator computers via communication interface 308. Those of ordinary skill in the art will understand that processor 300 may be implemented using a general purpose processor, a signal processor, RISC machines, an application specific integrated circuit (ASIC), a field programmable gate array (FPGA) device, and/or a combination thereof. Thus, embodiments of the present invention are not limited to any specific combination of hardware circuitry and/or software.

RAM 302 is used to store data and instructions for subsequent execution by processor 300. The data may include suitably formatted aircraft parameters, temporary variables or other intermediate information used during the execution of the program instructions by processor 300. Read only memory 304 is used to store static data and programming instructions. Taken together, RAM 302 and ROM 304 may be referred to herein as "computer-readable media." Further, the term "computer-readable medium," as used herein, refers to any medium that participates in providing data and/or instructions to the processor for execution. For example, the computer-readable media employed herein may include any suitable memory device including SRAM, DRAM, NVRWM, PROM, EROM, E²PROM, Flash memory, memory cards, flash drives, or any suitable type of memory. Non-volatile media may include, for example, optical or magnetic disks as well as the aforementioned memory devices.

I/O circuit 306 is configured to drive display unit 20 and accommodate the signals generated by user input devices 312, in response to user inputs. It will be apparent to those of ordinary skill in the pertinent art that modifications and variations can be made to display 20 of the present invention depending on weight, size, and cost issues. For example, display may be implemented using a cathode ray tube (CRT) device, a plasma panel display, a backlit display employing LCDs, LEDs or gaseous discharge lamps, passive or active matrix liquid crystal display (LCD) devices, or any suitable display means. Further, the display of the present invention may also include alpha-numeric indicia in addition to the digital display 20. The alpha-numeric data may display such messages as "limit load exceeded," or "aircraft is approaching ultimate limit loading," or "aircraft rolling inverted," and etc.

Those of ordinary skill in the art will understand that any number of suitable text messages may be provided by system 10 for training purposes.

In another embodiment, the present invention may include an audible device, such as a speaker, coupled to the display 20. I/O circuit 306 provides the audible indicator with an audible signal corresponding to the safety level of the maneuver. For example, if a limit load, or an ultimate limit load is being approached, a periodic beeping sound may be emitted. The intensity and periodicity may increase in accordance with the visual cues provided by display 20. In yet another embodiment, processor 300 may direct a pre-recorded human speech signal from memory to I/O circuit 306.

In one embodiment of the present invention, user input is limited to a data reset button and a data selection button configured to retrieve certain maximum and minimum data points. However, other embodiments of the present invention may include a keyboard, mouse, a trackball, or cursor direction keys for communicating information and command selections to the processor 300.

Communication interface circuit 308 is configured to provide bidirectional data communications between signal processor module 30 and external system 400 using any suitable means. External System 400 is a generic term that applied to aircraft sensor systems, ground based simulator systems, and/or external computing devices, systems and networks. Communication interface circuit 308 provides system 10 with a means for reprogramming/recalibrating processor 300. For example, limit loads, scaling factors, and are data are typically based on the aircraft platform.

Communication interface 308 may be implemented using any suitable communication technology including, but not limited to, RS-232, RS-485, USB, or PCI-Express data links. In another embodiment, system 10 may be configured to communicate with a flight simulator computer disposed in a remote location. In this instance, data may be served to system 10 by way of a local area network (LAN) or wide area network (WAN) server computer. Thus, communications interface 308 may be implemented using a LAN card, a digital subscriber line (DSL) card or modem, a cable modem, a telephone modem, or any other communication interface to provide a data communication connection to a corresponding type of communication line. Communication interface 308 may also support a wireless data link. In any of the aforementioned implementations, communication interface 308 is configured to transmit and receive electrical, electromagnetic, or optical signals that carry digital data streams representing various types of information. Although a single communication interface is depicted in FIG. 3, those of ordinary skill in the art will understand that multiple communication interfaces may also be employed.

The transmission media used to couple signal processor module 30 to display unit 20, and the external system 400 may include any suitable media such as coaxial cables, copper wires and/or cables, and fiber optic cable. Transmission media may also take the form of acoustic, optical, or electromagnetic waves, such as those generated during radio frequency (RF) and infrared (IR) data communications.

Figure 4:
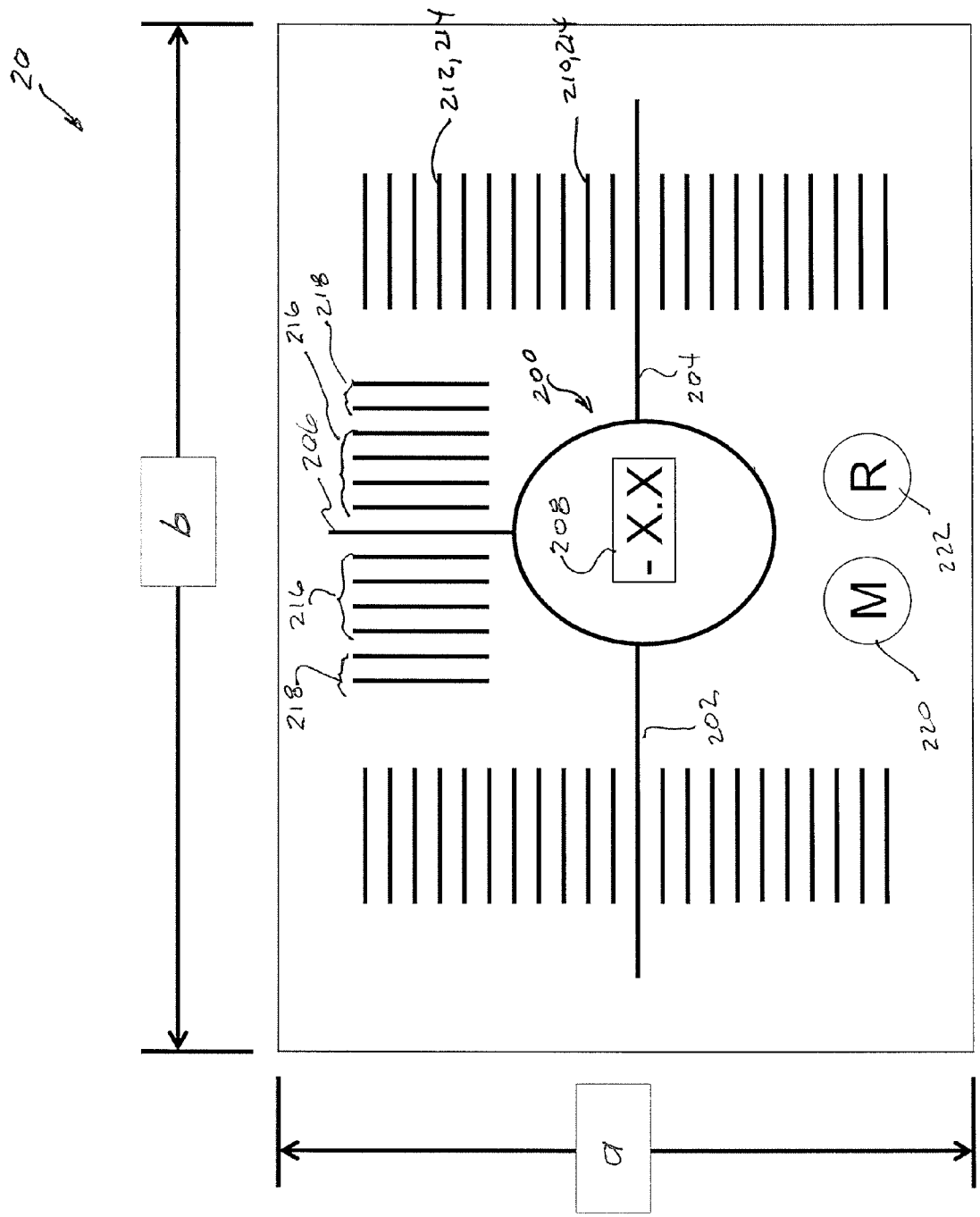
FIG. 4 is a diagrammatic depiction of the graphical user interface (GUI) provided on the cockpit display shown in FIG. 1.

As embodied herein and depicted in FIG. 4, a diagrammatic depiction of the graphical user interface (GUI) provided by the cockpit display device 20 is disclosed. The GUI includes a dual-axis aircraft icon 200 which is essentially a frontal or cross-sectional view of a generic aircraft. The central "fuselage" portion of icon 200 includes a digital vertical g-force display 208. The digital display 208 provides increments in tenths of g's, and displays the vertical load at the aircraft center of gravity. The display 20 also includes a reset button 222 and a memory button 220. The reset button 222 is coupled to I/O circuit 306 (FIG. 3) and is configured to reset all display values to zero. The memory button is also coupled to I/O circuit 306 and retrieves the maximum excursions recorded in memory (RAM 302) since the last reset.

Aircraft icon 200 includes a left wing icon 202, a right wing icon 204, and a rudder icon 206. Vertical loads are displayed relative to left wing icon 202 and right wing icon 204 using green horizontal bar icons 210, yellow horizontal bar icons 212, and flashing red horizontal bar icons 214.

The example provided in FIG. 4 shows an implementation for a typical transport aircraft such as an "Airbus." A non-maneuvering, symmetric, and level flight (1.0 g) is represented by dual-axis aircraft icon 200 alone, i.e., no horizontal bar icons (210, 212, 214) and no vertical bar icons (216, 218) are displayed. Each horizontal and vertical bar represents an 0.25 g incremental increase relative to either the wing icons 202, 204 or the rudder icon. When the trainee is attempting a safe maneuver, the green bar icons 210 are displayed. In the cargo transport example, for vertical loads greater than 1.0 g, the scale displays each 0.25 g increment in green in the range from 1.0-2.5 g's. For a transport category aircraft, the "limit load factor" is 2.5 g. Thus, for the range between 2.5 g's and 3.75 g's, yellow horizontal bar icons 212 are employed. For loads in excess of 3.75 g's (i.e., the "ultimate load" for a transport aircraft), flashing red horizontal bars 214 are employed.

The horizontal bars displayed under the wing icons 202, 204 represent unloading conditions. For g-loads in the range between 1.0 g and 0.0 g's, the green bar icons 210 are used. In the range between 0.0 g and −1.5 g's, yellow horizontal bar icons 212 are displayed. For negative g-loads in lower than −1.5 g's, the entire scale is flashing red, i.e., flashing red horizontal bars 214 are displayed.

Lateral loads (216, 218) are displayed relative to rudder icon 206 with yellow vertical bar icons 216 and red vertical bar icons 218. For a lateral load, the display is yellow until the ultimate load is reached, that is, yellow vertical bar icons 216 are displayed. When the ultimate load is reached, the entire scale changes to red and flashing red vertical bar icons 218 are displayed. In the example provided, yellow vertical bar icons 216 are used for lateral loads from 0.0 g to the limiting rudder load (varies by aircraft type). For loads in excess of the rudder limit load, the scale turns flashing red, i.e., all of the vertical bar icons are flashing red icons 218. Depending on the rudder input and degree of asymmetric flight (sideslip angle), the rudder load can be exceeded momentarily with little or no lateral g-force. In this case, all of the vertical bar icons are flashing red icons 218.

As those of ordinary skill in the art will appreciate, a GUI is generated by a software program running on a computerized system, in this case, signal processor module 30. In general terms, the present invention receives a plurality of aircraft parameters from an external platform, such as a ground-based flight simulator or from various sensors disposed on board an aircraft. Processor module 30 calculates a left wing and a right wing vertical g-force value in real time based on the plurality of aircraft parameters received from the external platform. Signal processor module 30 also calculates a lateral g-force value in real time. The vertical g-force values are displayed relative to a vertical reference value using the horizontal bar icons 210, 212, 214 and/or the digital display 208. The lateral g-force value is displayed relative to the predetermined lateral reference value, i.e., rudder icon 206, using the vertical display icons 216, 218.

Thus, display 20 superimposes the multi-colored horizontal bars 210, 212, 214 and vertical bar icons 216, 218 over the dual-axis aircraft icon 200 to show differential vertical and rudder loading. Table I provides an example of the plurality of aircraft parameters that may be used to drive display 20 in accordance with an embodiment of the present invention.

TABLE I

| Parameter | Symbol | Units | Comments |
|---|---|---|---|
| Vertical Acceleration | $N_z$ | g's | positive up (+1 level flight) |
| Equivalent Airspeed | $V_e$ | Knots | |
| Angle of Sideslip | $\beta$ | Deg | positive nose left |
| Aileron Deflection down | $\delta_a$ | Deg | positive rolls left wing |
| Rudder Deflection | $\delta_r$ | Deg | positive left rudder |

In general, the left wing vertical g-force value is calculated by:

$$N_{zl} = \left(1 - \frac{A}{B}\delta_a\right)N_Z$$

$N_{zl}$ is of course, the left wing vertical force, $N_Z$ is a vertical acceleration (also provided by digital display 208), B is maximum aileron deflection in degrees, A is a percentage of $N_Z$ added to the maximum aileron deflection B, and $\delta_a$ is aileron deflection in degrees. The values A, B are not identified in the above Table I because these values are platform (aircraft) dependent scaling constants.

The right wing vertical g-force value, $N_{zr}$, is calculated by:

$$N_{zr} = \left(1 + \frac{A}{B}\delta_a\right)N_Z$$

The lateral g-force value is calculated by:

$$Y_{tail} = (C\beta - D\delta_r)\frac{V_e^2}{E^2}$$

C is a sideslip scaling factor, $\beta$ is angle of sideslip, D is a rudder scaling factor, $\delta_r$ is rudder deflection, $V_e$ is equivalent airspeed, and E is reference airspeed. The values C, D are also not provided in the above Table I because these values are platform (aircraft) dependent scaling constants.

An example calculation for a cargo transport type of aircraft is provided below. Note that the numerical values are substituted for scaling factors A, B, C, and D. As noted, these constants are platform dependent. The reader will also note that while the example display screens provided below are directed to the cargo transport aircraft, the present invention should not be construed as being limited to this example.

$$N_{zl} = \left(1 - \frac{0.25}{20}\delta_a\right)N_z$$

$$N_{zr} = \left(1 + \frac{0.25}{20}\delta_a\right)N_z$$

$$Y_{tail} = (0.1\beta - 0.06\delta_r)\frac{V_e^2}{250^2}$$

Figure 5:
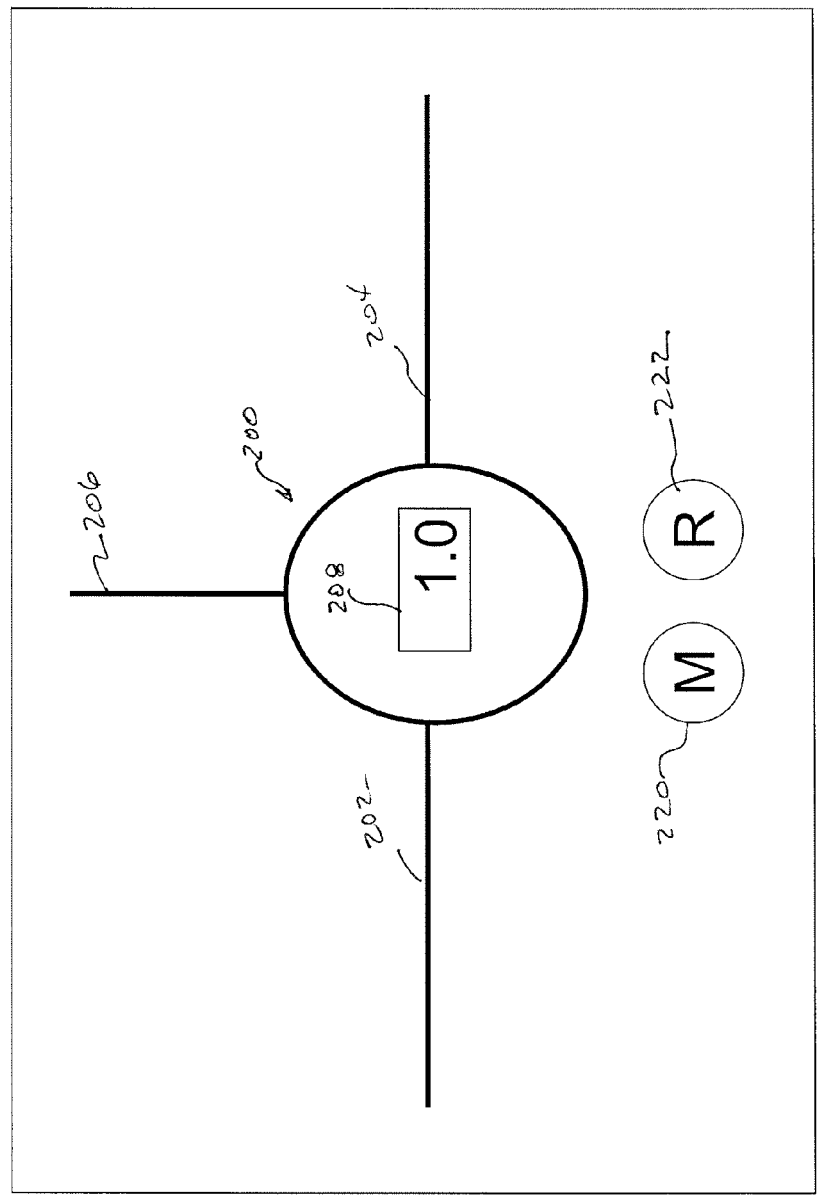
FIG. 5 is a diagram showing the GUI display for a symmetric 1.0 g flight.

Referring to FIG. 5, an example diagram showing the GUI display for a symmetric, level, and non-maneuvering 1.0 g flight is shown. Note that left wing icon 202 and right wing icon 204 provide a vertical reference corresponding to a 1.0 g symmetric, non-maneuvering, level flight. The term level refers to a scenario wherein the aircraft is traveling substantially parallel to the earth's surface. In response to being provided with the aircraft parameters corresponding to the above stated flight conditions, signal processor module 30 performs the calculations provided above and drives display 20 such that no horizontal bars 210, 212, 214 and no vertical bar icons 216, 218 are displayed.

Figure 6:
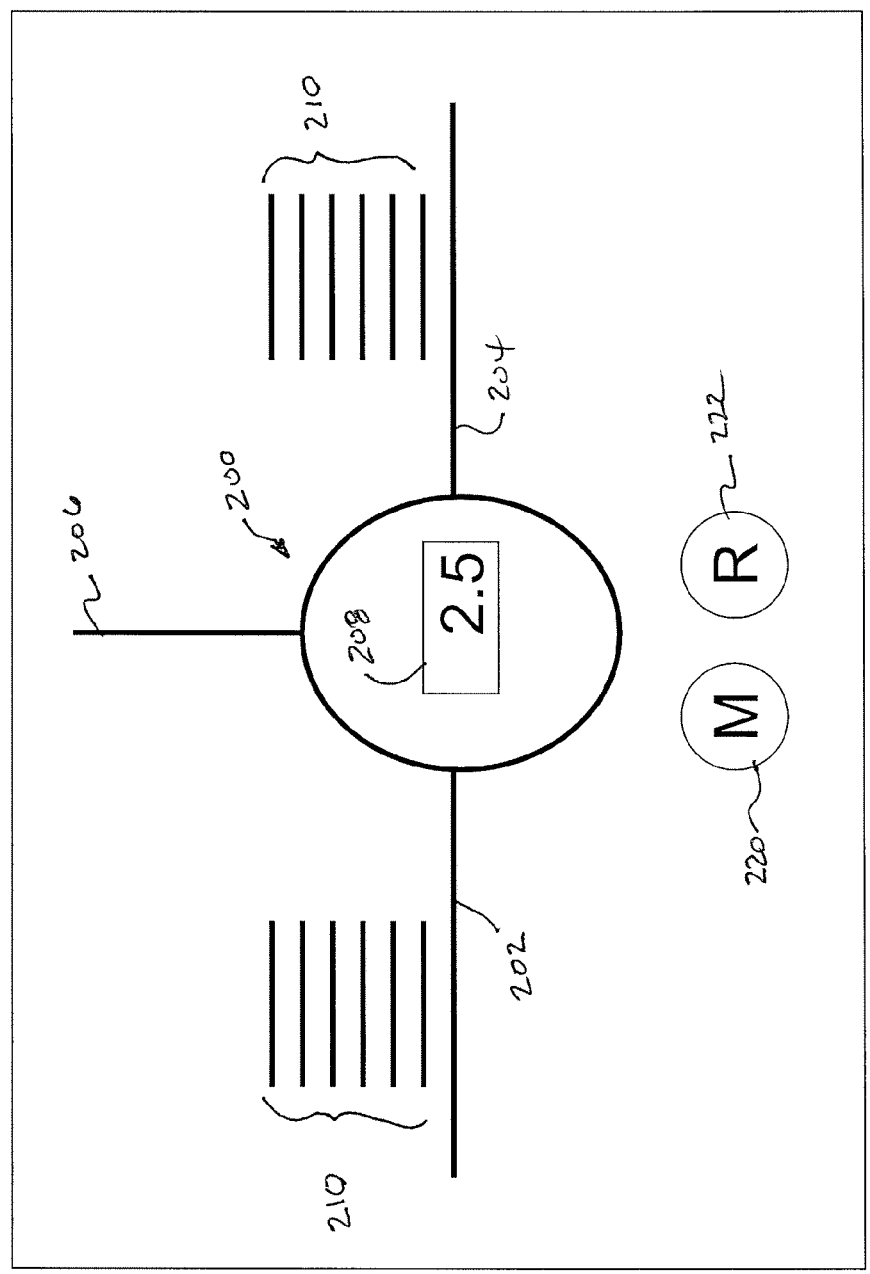
FIG. 6 is a diagram showing the GUI display for a symmetric 2.5 g pull maneuver.

Referring to FIG. 6, an example diagram showing the GUI display for a symmetric 2.5 g pull maneuver is shown. Because FIG. 6 is a symmetric pull that is below the limit load of the cargo transport aircraft, the GUI is configured to display an equal number of green horizontal bar icons 210 over the left wing icon 202 and the right wing icon 204. Comparing FIG. 5 with FIG. 6, one of ordinary skill in the art will understand that in practice, display 20 will show instantaneous fluctuations, within the 0.25 g incremental sensitivity of the present invention, corresponding to the fluctuation of instantaneous forces being applied to the aircraft. For example, as the aircraft or simulator transitions from a 1.0 g flight path to a 2.5 g pull, one green horizontal bar will be displayed after another in sequence until the 2.5 g pull is completed. When the proper altitude is reached, the aircraft will return to a 1.0 g non-maneuvering. System 10 displays all such flight path transitions instantaneously.

Figure 7:
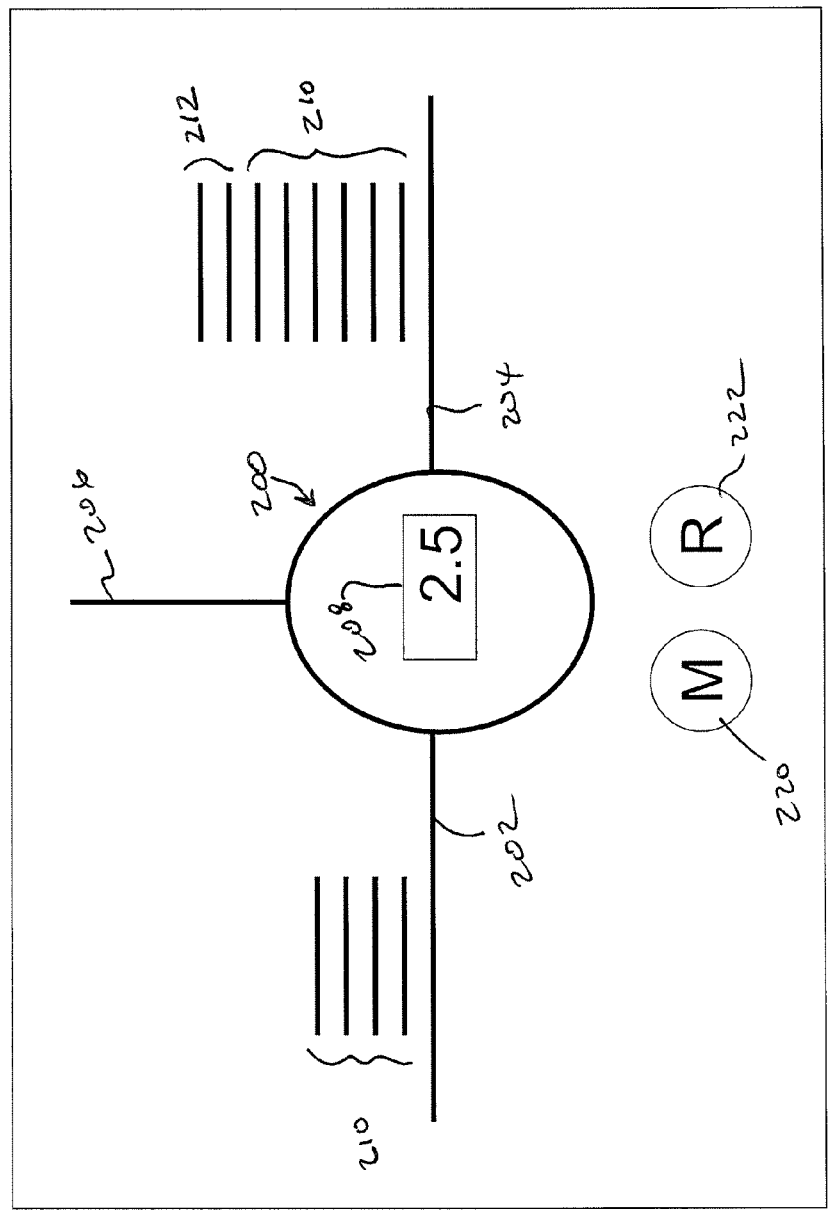
FIG. 7 is a diagram showing the GUI display for a rolling 2.5 g pull maneuver.

FIG. 7 is an example diagram showing the GUI display for a rolling 2.5 g pull maneuver. The left wing vertical force is represented by four green horizontal bar icons 210. This corresponds to a left wing vertical force of 2.0 g. The right wing shows six green horizontal bar icons plus an additional two yellow horizontal bar icons 212. Eight horizontal bars equates to a right wing vertical force of 3.0 g. Thus, the right wing is working harder than the left wing. The yellow bar icons 212 are used above 2.5 g to indicate that the limit load has been exceeded. Note also that digital display 208 provides a display of the 2.5 g vertical acceleration used in the right wing 204 and left wing 202 display calculations.

Figure 8:
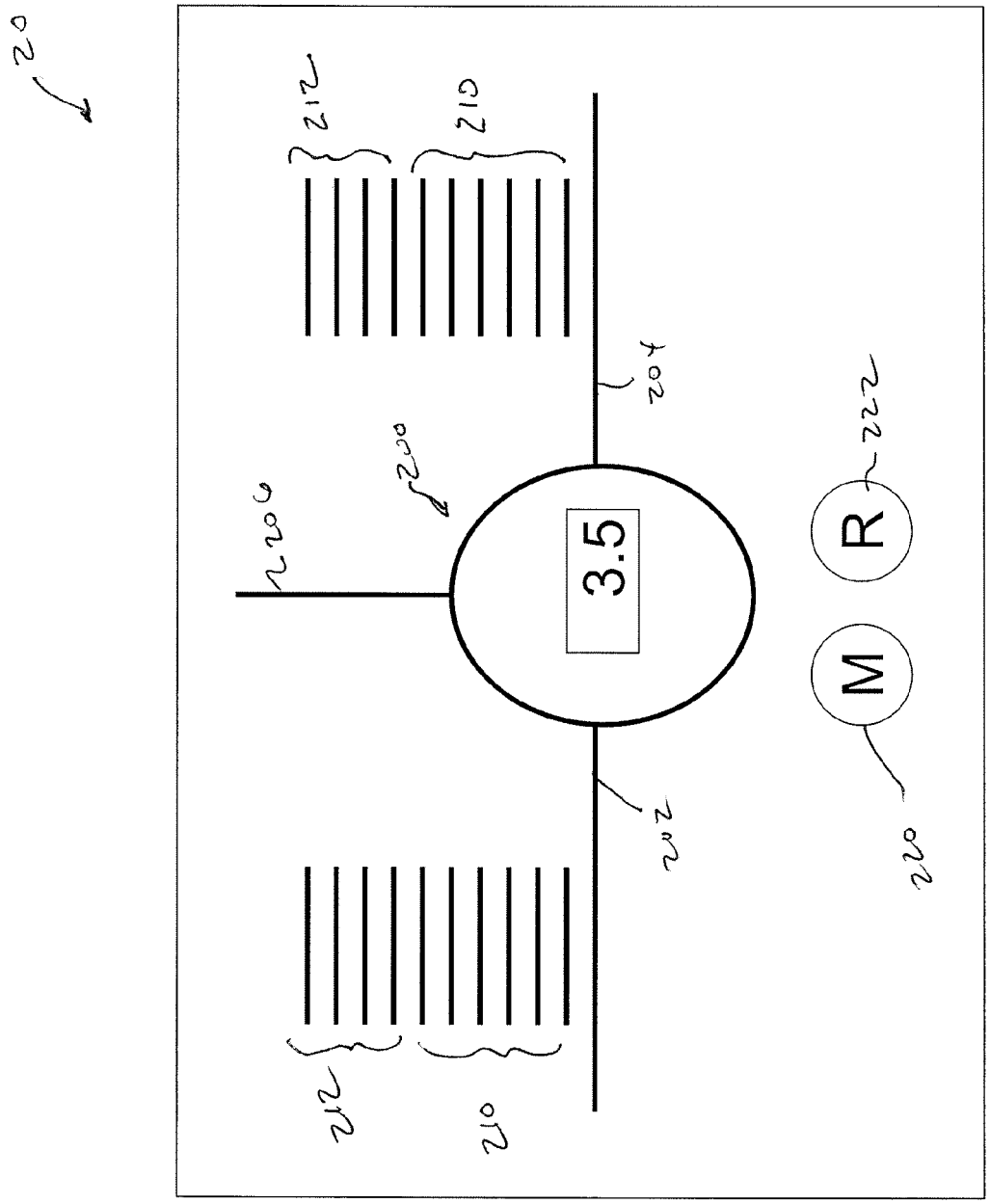
FIG. 8 is a diagram showing the GUI display for a symmetric 3.5 g pull maneuver.

FIG. 8 is an example diagram showing the GUI display for a symmetric 3.5 g pull maneuver. Because the pilot, or trainee, is performing a symmetric maneuver, there are an equal number of horizontal bars over each of the wings 202, 204. However, because the vertical acceleration is over 2.5 g, the processor module detects that the limit load value (2.5 g) has been exceeded. Accordingly, four yellow horizontal bar icons are displayed over six green icons 210. All told, there are ten horizontal bars, indicating that 3.5 g's are being applied to each wing.

Figure 9:
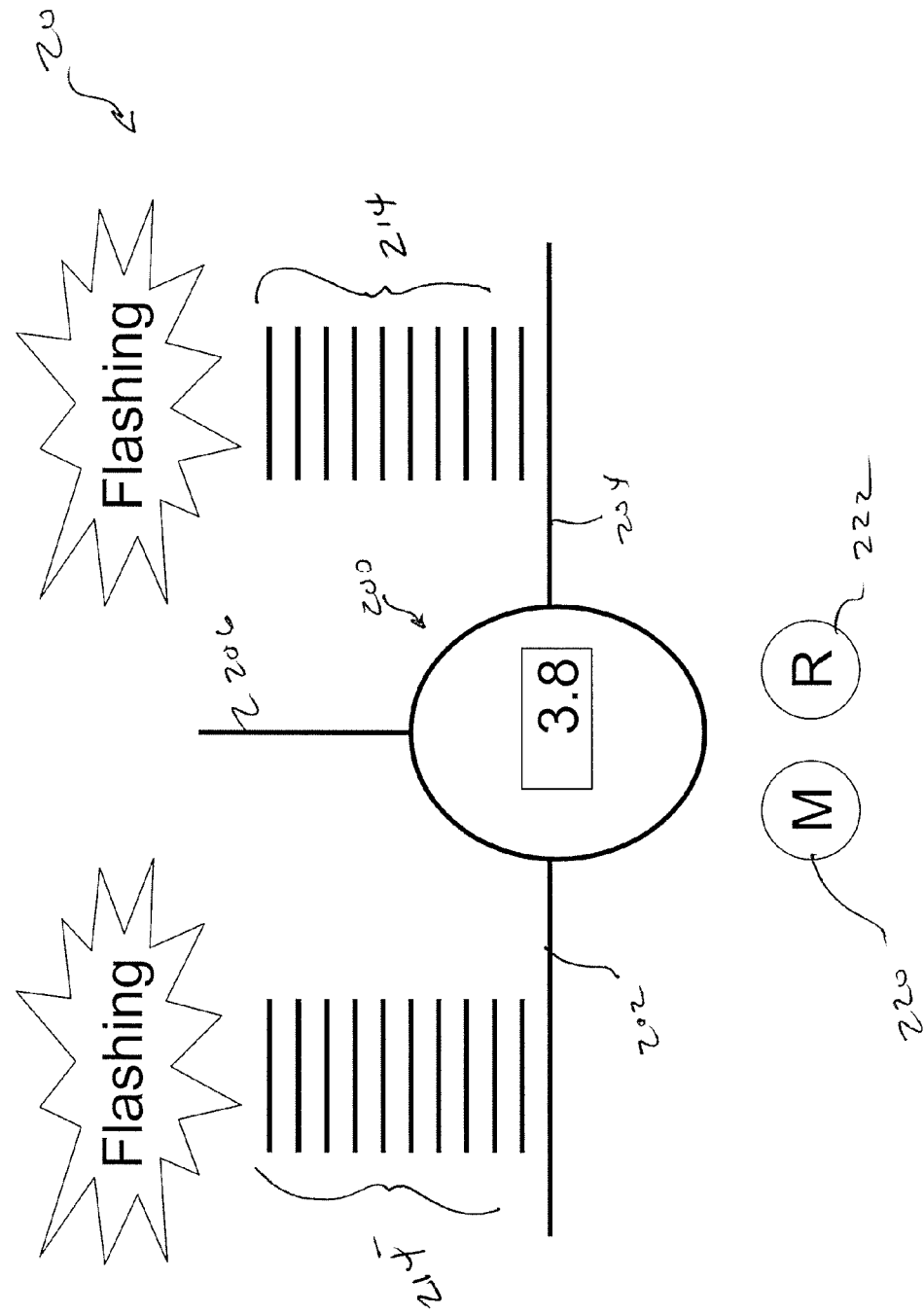
FIG. 9 is a diagram showing the GUI display for a symmetric 3.8 g pull maneuver.

Referring to FIG. 9, an example diagram showing the GUI display for a symmetric 3.8 g pull maneuver is shown. Because 3.8 g's exceeds the ultimate limit load for the cargo aircraft, flashing red horizontal bar icons 214 are displayed.

Figure 10:
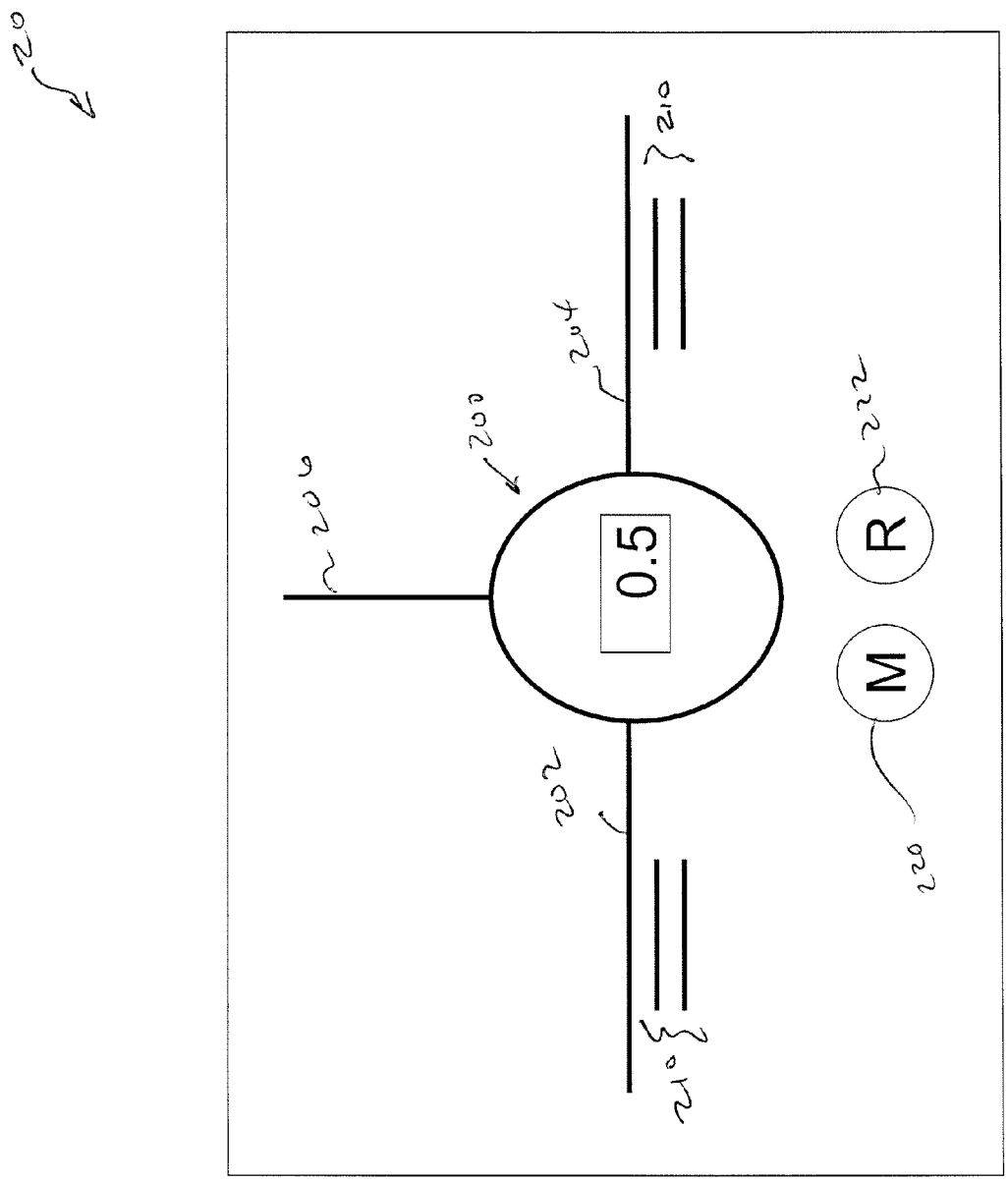
FIG. 10 is a diagram showing the GUI display for a symmetric 0.5 g unload maneuver.

FIG. 10 is an example diagram showing the GUI display for a safe unloading maneuver. In this case, the pilot is attempting a symmetric 0.5 g unload. This, of course, corresponds to two 0.25 g increments. Accordingly, two green bar icons 210 are displayed under each wing icon 202, 204. As noted above, the horizontal bars are displayed under the wings to depict an unloading maneuver.

Figure 11:
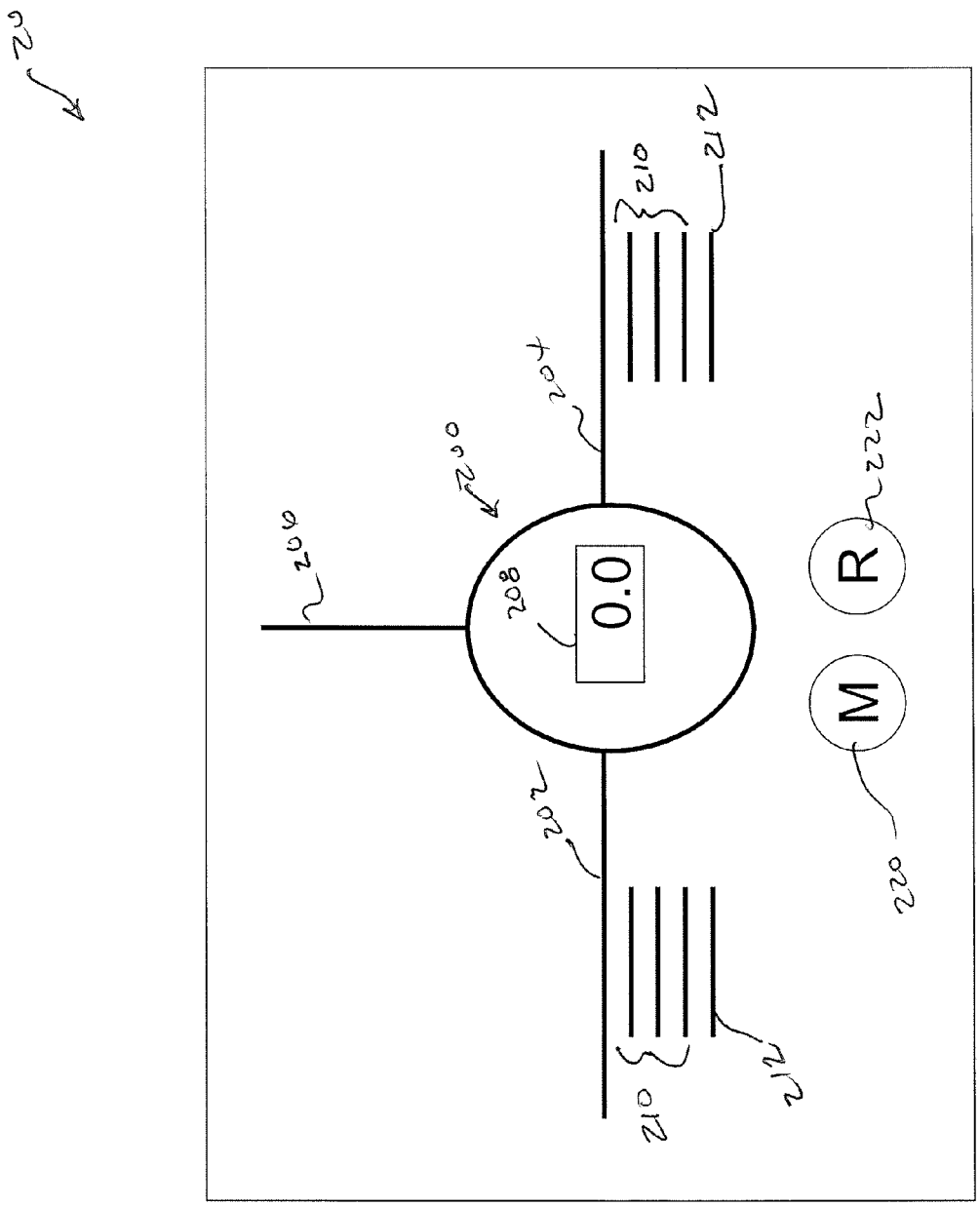
FIG. 11 is a diagram showing the GUI display for a symmetric 0.0 g unload maneuver.
Figure 12:
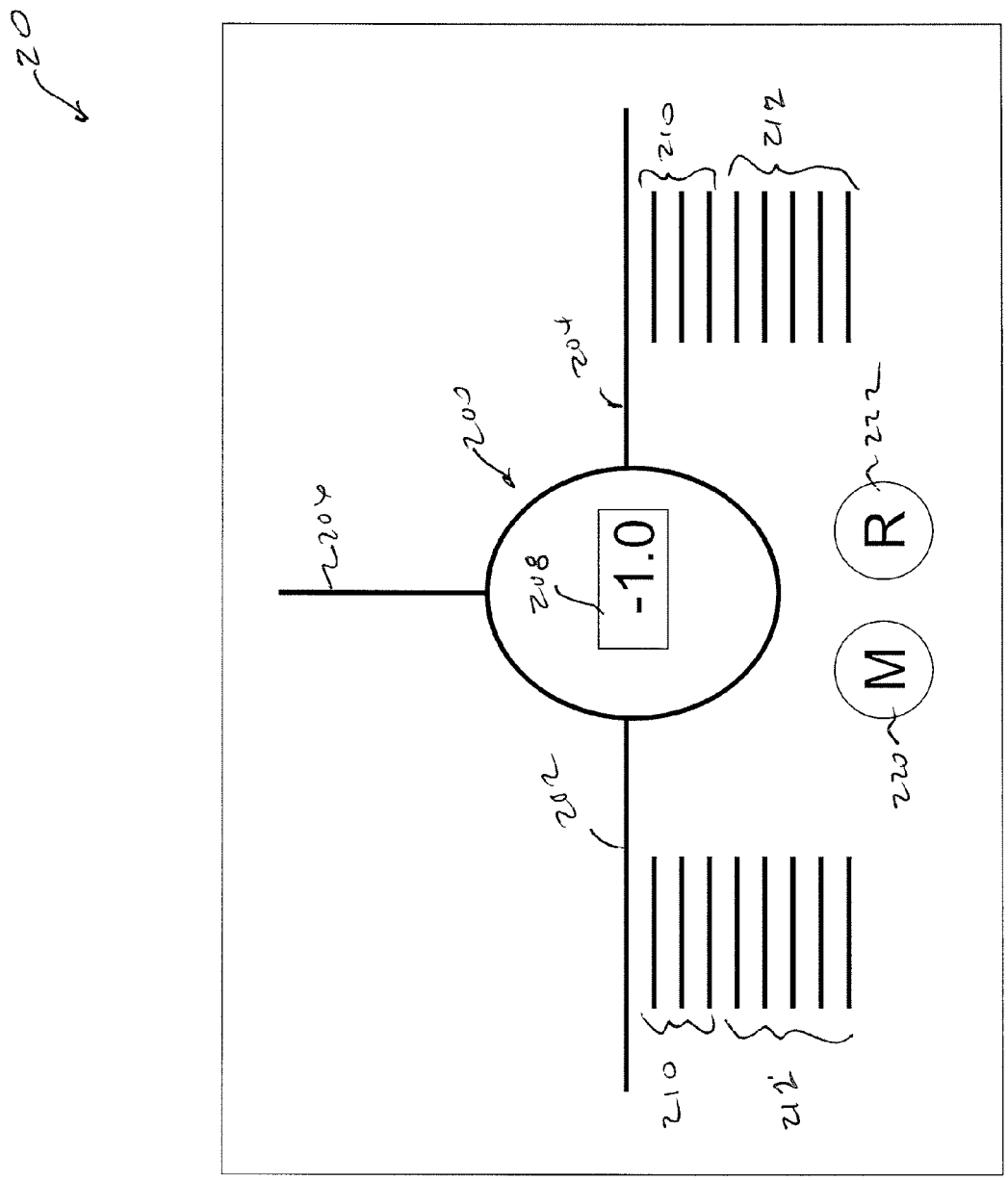
FIG. 12 is a diagram showing the GUI display for a symmetric −1.0 g unload maneuver.
Figure 13:
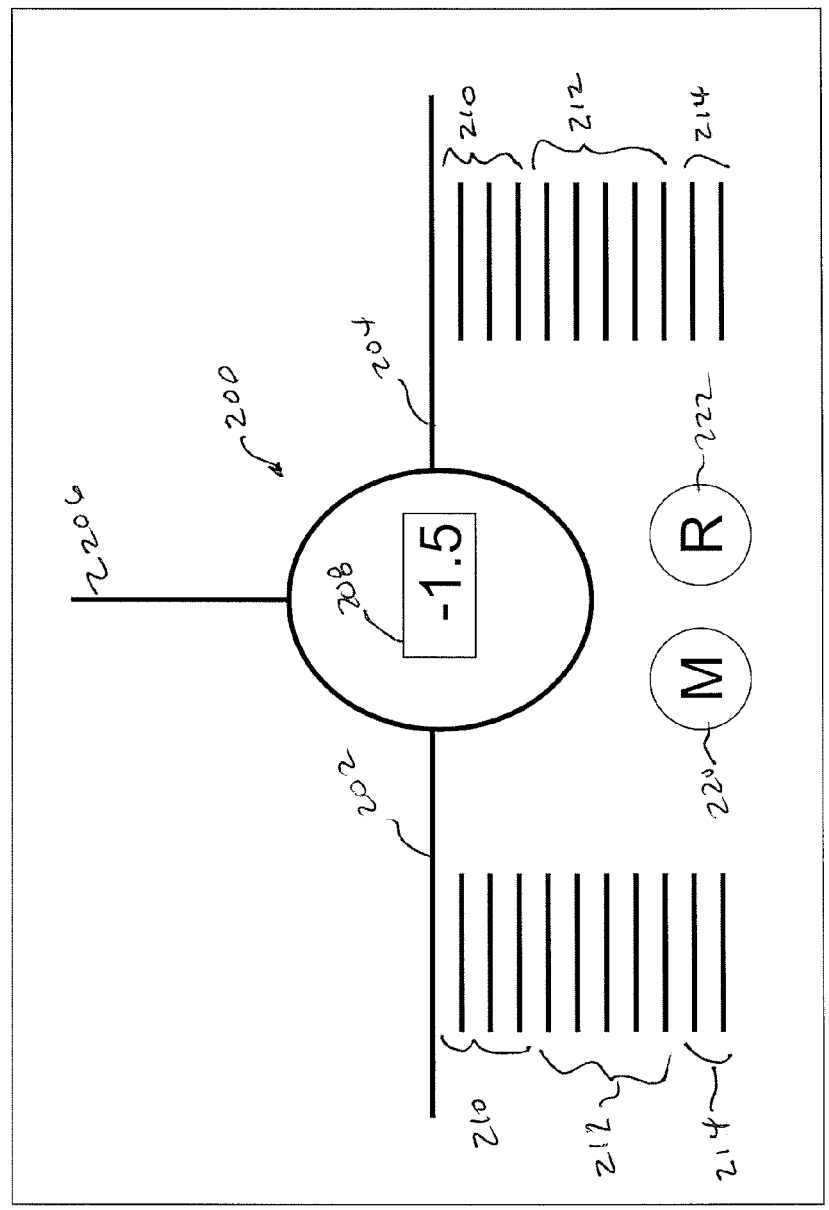
FIG. 13 is a diagram showing the GUI display for a symmetric −1.5 g unload maneuver.
Figure 14:
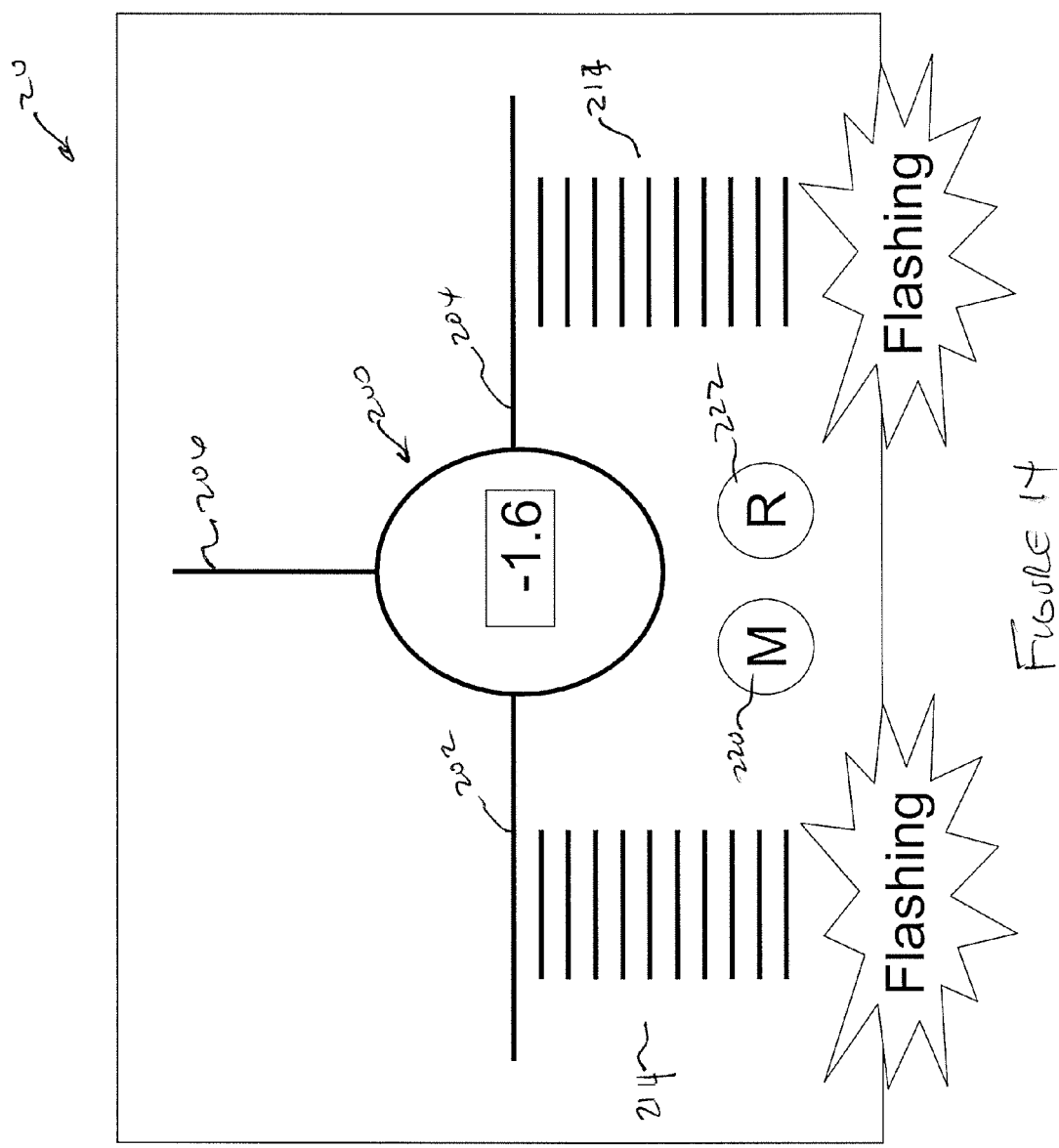
FIG. 14 is a diagram showing the GUI display for a symmetric −1.6 g unload maneuver.

A sequence of unsafe unloading maneuvers is illustrated by FIGS. 11-14. FIG. 11 is an example diagram showing the GUI display for a symmetric 0.0 g unload maneuver. In the cargo aircraft example, a symmetric 0.0 g unload maneuver is a borderline maneuver that exceeds the limit load by 0.25 g. Thus, the last horizontal bar displayed is a yellow horizontal bar icon 212. FIG. 12 shows display 20 for a symmetric −1.0 g unload maneuver. At this point, the nose of the transport aircraft is pitched downward. As the negative g-forces applied by the unloading increase, it is increasingly probable that neither oil nor fuel are being supplied to the engine(s). FIG. 13 shows a symmetric −1.5 g unload maneuver. Display 20 provides green, yellow and red horizontal bars indicating that the aircraft is approaching an envelope condition. In FIG. 14, the g-forces applied to the aircraft are increased to −1.6 g's. The applied g-forces exceed the ultimate limit load of the aircraft and the scale is flashing with red horizontal bar icons 214 indicating that disaster is imminent.

Figure 15:
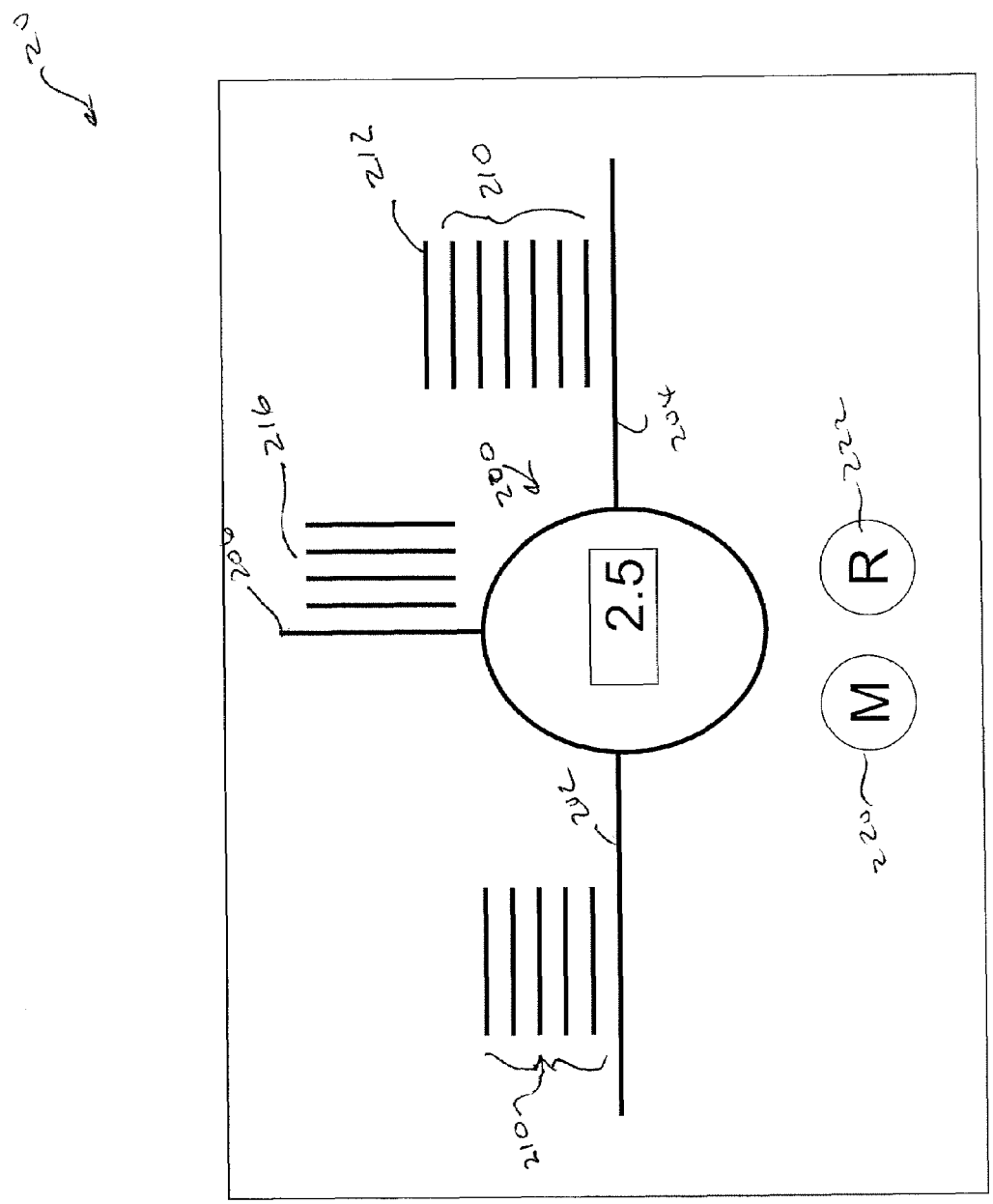
FIG. 15 is a diagram showing the GUI display for a rudder hardover maneuver causing an aircraft roll inverted.

Referring to FIG. 15, an example diagram showing the GUI display for an unsafe rudder hardover maneuver is shown. In this scenario, the aircraft's rudder is moved into a full-right position. This rudder hardover event is graphically displayed by the four yellow vertical bar icons 216. At the same time, the aircraft is pulling asymmetrically as shown by the asymmetric pulling forces on each wing; right wing icon 204 has seven horizontal bars, whereas the left wing icon 202 only has five bars 210. The attempted maneuver may cause inverted aircraft rolling, i.e., the aircraft may start to spiral uncontrollably.

Figure 16:
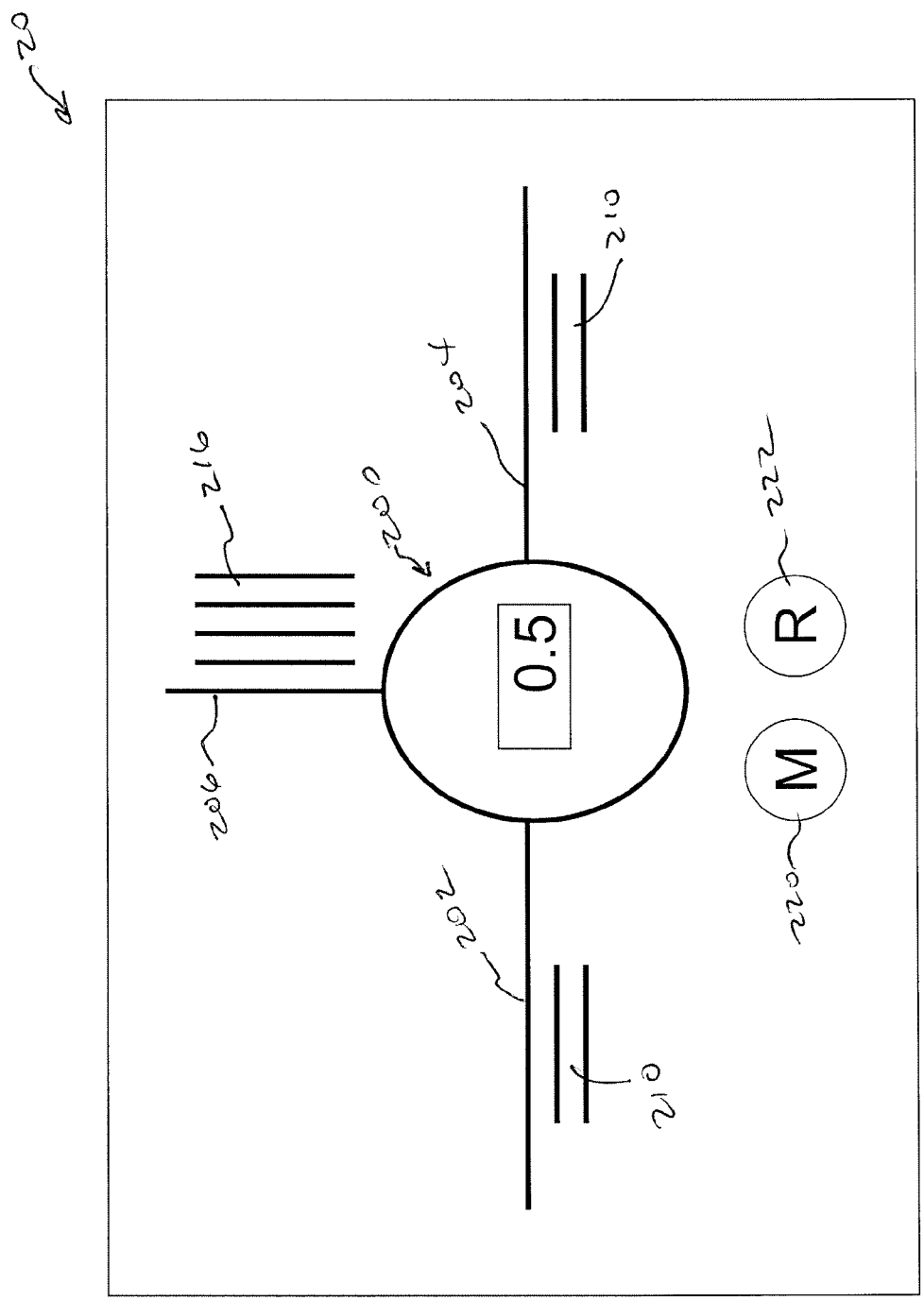
FIG. 16 is a diagram showing the GUI display for a rudder hardover maneuver using the correct technique.

FIG. 16 is an example diagram showing the GUI display for a rudder hardover maneuver using the correct technique. Again, the rudder is driven to the hardover position. However, the pilot employs the correct technique by combining the hardover maneuver with a symmetric 0.5 g unload.

Figure 17:
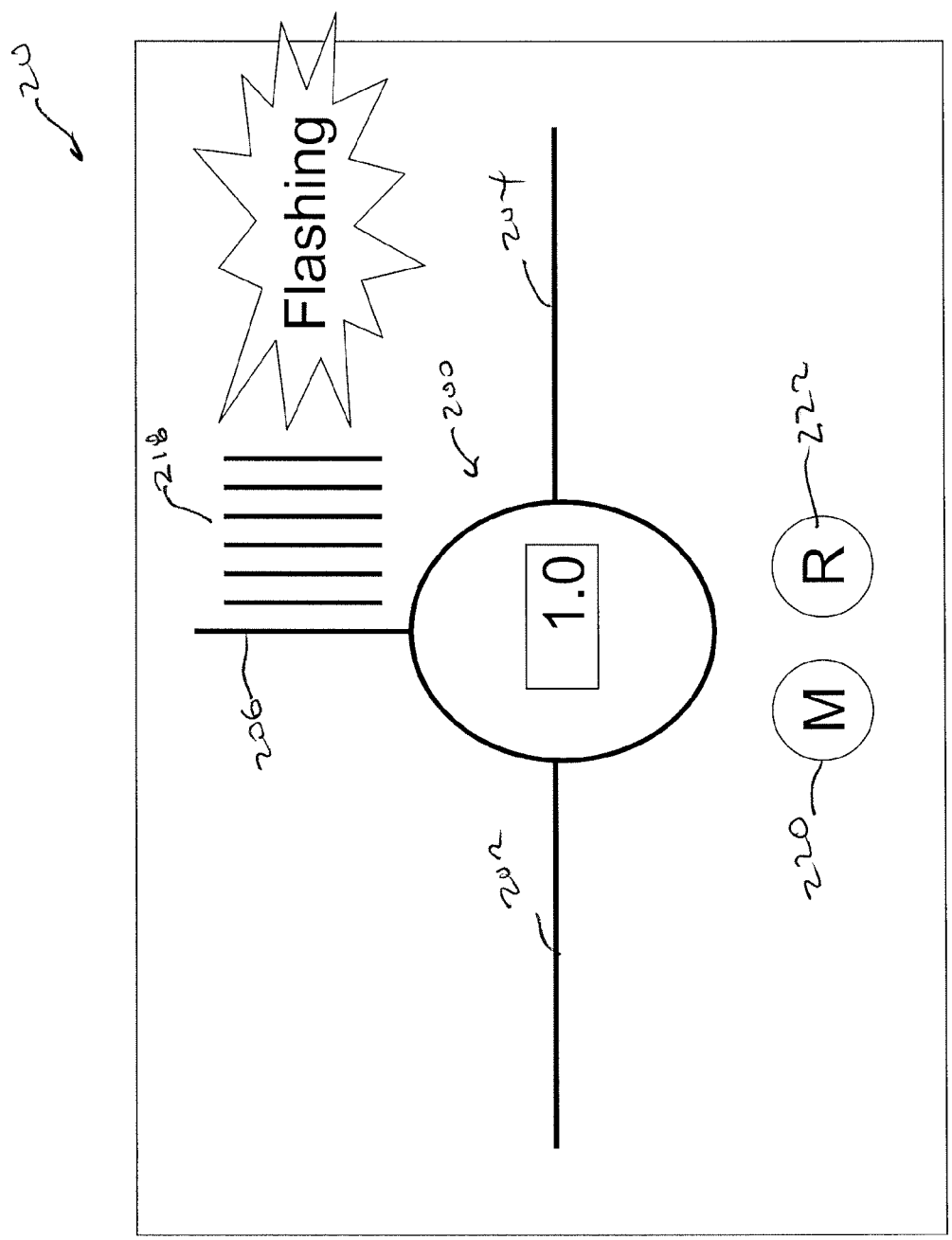
FIG. 17 is a diagram showing the GUI display for an extremely dangerous rudder hardover maneuver.

Referring to FIG. 17, an example diagram showing the GUI display for an extremely dangerous rudder hardover maneuver. In this case, the lateral load (1.5 g) exceeds the ultimate limit load indicating that a structural failure is about to occur.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. In a computerized system including a graphical user interface (GUI) having a display and a data input device, a method comprising:
   providing a plurality of aircraft parameters;
   calculating at least one vertical g-force value in real time based on the plurality of aircraft parameters;
   calculating a lateral g-force value in real time based on the plurality of aircraft parameters;
   displaying the at least one vertical g-force value relative to at least one predetermined vertical reference value; and
   displaying the lateral g-force value relative to at least one predetermined lateral reference value.

2. The method of claim 1, wherein the plurality of aircraft parameters are provided by a ground-based flight simulator.

3. The method of claim 2, wherein the plurality of aircraft parameters are calculated by the ground-based flight simulator as a function of aircraft type, and wherein the step of calculating at least one vertical g-force value includes multiplying at least one of the plurality of parameters by at least one scaling factor, the at least one scaling factor corresponding to the aircraft type.

4. The method of claim 1, wherein the plurality of aircraft parameters are provided by at least one sensor disposed on an aircraft.

5. The method of claim 3, wherein the step of calculating at least one vertical g-force value includes multiplying at least one of the plurality of parameters by at least one scaling factor, the at least one scaling factor corresponding to aircraft type.

6. The method of claim 1, wherein the step of calculating at least one vertical g-force value includes calculating a left wing vertical g-force value and a right wing vertical g-force value.

7. The method of claim 6, wherein the left wing vertical g-force value is a function of a vertical acceleration and an aileron deflection amount.

8. The method of claim 7, wherein the left wing vertical g-force value is calculated by:

$$N_{zl} = \left(1 - \frac{A}{B}\delta_a\right)N_Z$$

wherein $N_Z$ is a vertical acceleration, B is a maximum aileron deflection in degrees, A is a percentage of $N_Z$ added to the maximum aileron deflection B, and $\delta_a$ is aileron deflection in degrees.

9. The method of claim 6, wherein the right wing vertical g-force value is a function of a vertical acceleration and an aileron deflection amount.

10. The method of claim 9, wherein the right wing vertical g-force value is calculated by:

$$N_{zr} = \left(1 + \frac{A}{B}\delta_a\right)N_Z$$

wherein $N_Z$ is a vertical acceleration, B is a maximum aileron deflection in degrees, A is a percentage of $N_Z$ added to the maximum aileron deflection B, and $\delta_a$ is aileron deflection in degrees.

11. The method of claim 6, wherein the step of displaying the at least one vertical g-force value relative to a predetermined vertical g-force value includes the step of displaying differential g-force loading, the differential g-force loading including a simultaneous display of the left wing vertical g-force value and the right wing lateral g-force value.

12. The method of claim 11, wherein the display of differential g-force loading is configured to show a symmetric vertical pull condition, a symmetric vertical unloading condition, an asymmetric vertical pull condition or an asymmetric vertical unloading condition.

13. The method of claim 1, wherein the lateral g-force value is calculated by:

$$Y_{tail} = (C\beta - D\delta_r)\frac{V_e^2}{E^2}$$

wherein C is a sideslip scaling factor, $\beta$ is angle of sideslip, D is a rudder scaling factor, $\delta_r$ is rudder deflection, $V_e$ is equivalent airspeed, and E is reference airspeed.

14. The method of claim 1, wherein the display includes a dual-axis icon having a left wing icon portion, a right wing icon portion, and a vertical rudder icon portion.

15. The method of claim 14, wherein the GUI is configured to display an equal number of horizontal bar icons disposed over the left wing icon portion and the right wing icon portion to represent a symmetric pulling aircraft maneuver, and wherein the GUI is configured to display an equal number of horizontal bar icons disposed under the left wing icon portion and the right wing icon portion to represent a symmetric unloading aircraft maneuver.

16. The method of claim 15, wherein the GUI is configured to display an unequal number of horizontal bar icons disposed over the left wing icon portion and the right wing icon portion to represent an asymmetric pulling aircraft maneuver, and wherein the GUI is configured to display an unequal number of horizontal bar icons disposed under the left wing icon portion and the right icon portion to represent an asymmetric unloading aircraft maneuver.

17. The method of claim 16, wherein green horizontal bar icons are displayed to indicate a safe maneuver, yellow horizontal bar icons are displayed to indicate a borderline safe loading condition, red horizontal bar icons are displayed to indicate a limit loading condition, and flashing red horizontal bar icons are displayed to indicate an ultimate limit loading condition.

18. The method of claim 14, wherein the GUI is configured to display vertical bar icons adjacent the vertical rudder icon portion to indicate a lateral loading condition.

19. The method of claim 18, wherein green vertical bar icons are displayed to indicate a safe rudder load condition, yellow vertical bar icons are displayed to indicate a limit load rudder condition, and flashing red vertical bar icons are displayed to indicate an ultimate limit load rudder condition.

20. The method of claim 1, wherein the at least one predetermined vertical reference value corresponds to a symmetric non-maneuvering aircraft condition.

21. The method of claim 1, wherein the at least one predetermined vertical reference value corresponds to a limit load condition for a predetermined type of aircraft.

22. The method of claim 1, wherein the at least one predetermined vertical reference value corresponds to an ultimate limit load condition for a predetermined type of aircraft.

23. The method of claim 1, wherein the at least one predetermined lateral reference value corresponds to a symmetric non-maneuvering aircraft condition.

24. The method of claim 1, wherein the at least one predetermined vertical reference value is a rudder limit load value for a predetermined type of aircraft.

25. The method of claim 1, wherein the at least one predetermined lateral reference value is an ultimate rudder limit load value for a predetermined type of aircraft.

26. The method of claim 1, wherein the step of displaying the at least one vertical g-force value includes displaying a vertical acceleration value.

27. A system comprising:
a computing circuit configured to calculate in real time at least one vertical g-force value and a lateral g-force value based on a plurality of aircraft parameters, the computing circuit also being configured to generate vertical g-force display data and lateral g-force display data, the vertical g-force display data comparing the at least one vertical g-force value relative to at least one predetermined vertical reference value, the lateral g-force display data comparing the lateral g-force value relative to at least one predetermined lateral reference value; and
a display device coupled to the computing circuit, the display being configured to display the vertical g-force display data and the lateral g-force display data.

28. The system of claim 27, wherein the computing circuit is coupled to a ground-based flight simulator configured to generate the plurality of aircraft parameters based on user aircraft control inputs to the ground-based simulator.

29. The system of claim 27, wherein the system is disposed on an aircraft, the computing circuit being coupled to at least one sensor configured to provide the plurality of aircraft parameters to the computing circuit.

30. The system of claim 27, wherein the computing circuit is configured to calculate a left wing vertical g-force value and a right wing vertical g-force value.

31. The system of claim 30, wherein the left wing vertical g-force value is calculated by:

$$N_{zl} = \left(1 - \frac{A}{B}\delta_a\right)N_Z$$

wherein $N_Z$ is a vertical acceleration, B is a maximum aileron deflection in degrees, A is a percentage of $N_Z$ added to the maximum aileron deflection B, and $\delta_a$ is aileron deflection in degrees.

32. The system of claim 30, wherein the right wing vertical g-force value is calculated by:

$$N_{zr} = \left(1 + \frac{A}{B}\delta_a\right)N_Z$$

wherein $N_Z$ is a vertical acceleration, B is a maximum aileron deflection in degrees, A is a percentage of $N_Z$ added to the maximum aileron deflection B, and $\delta_a$ is aileron deflection in degrees.

33. The system of claim 32, wherein the vertical g-force display data includes differential g-force loading display data, the differential g-force loading display data including a simultaneous display of the left wing vertical g-force value and the right wing lateral g-force value.

34. The system of claim 33 wherein the differential g-force loading display data is configured to display a symmetric vertical pull condition, a symmetric vertical unloading condition, an asymmetric vertical pull condition or an asymmetric vertical unload condition.

35. The system of claim 27, wherein the lateral g-force value is calculated by:

$$Y_{tail} = (C\beta - D\delta_r)\frac{V_e^2}{E^2}$$

wherein C is a sideslip scaling factor, $\beta$ is angle of sideslip, D is a rudder scaling factor, $\delta_r$ is rudder deflection, $V_e$ is equivalent airspeed, and E is reference airspeed.

36. The system of claim 27, wherein the display device includes a dual-axis icon superimposed on a viewing portion thereof, the dual-axis icon includes a left horizontal wing icon portion, a right horizontal wing icon portion, and a vertical line icon portion corresponding to a symmetric non-maneuvering aircraft state.

37. The system of claim 36, wherein the vertical g-force display data is configured by the computing circuit to display an equal number of horizontal bar icons disposed over the left horizontal wing icon portion and the right horizontal wing icon portion to represent a symmetric pulling aircraft maneuver, and wherein the vertical g-force display data is configured by the computing circuit to display an equal number of horizontal bar icons disposed under the left horizontal wing icon portion and the right horizontal wing icon portion to represent a symmetric unloading aircraft maneuver.

38. The system of claim 37, wherein the vertical g-force display data is configured by the computing circuit to display an unequal number of horizontal bar icons disposed over the left horizontal wing icon portion and the right horizontal wing icon portion to represent an asymmetric pulling aircraft maneuver, and wherein the vertical g-force display data is configured by the computing circuit to display an unequal number of horizontal bar icons disposed under the left horizontal wing icon portion and the right horizontal wing icon portion to represent an asymmetric unloading aircraft maneuver.

39. The system of claim 38, wherein green horizontal bar icons are displayed to indicate a safe maneuver, yellow horizontal bar icons are displayed to indicate a limit loading condition, and red horizontal bar icons are displayed to indicate an ultimate limit loading condition.

40. The system of claim 36, wherein the lateral g-force display data is configured by the computing circuit to display vertical bar icons adjacent the vertical line icon portion to indicate a rudder load.

41. The system of claim 40, wherein green vertical bar icons are displayed to indicate a safe rudder load, yellow vertical bar icons are displayed to indicate a limit load rudder condition, and red vertical bar icons are displayed to indicate an ultimate limit load rudder condition.

42. The system of claim 27, wherein the computing circuit includes a microprocessor, a signal processor, an ASIC, and/or a FPGA device.

43. The system of claim 42, further comprising at least one user input device configured to retrieve selected vertical g-force display data and lateral g-force display data.

44. The system of claim 43, wherein the selected vertical g-force display data and lateral g-force display data includes maximum vertical g-force values and maximum lateral g-force values.

45. The system of claim 43, wherein the at least one user input device includes a display reset device configured to reset the display device.

* * * * *